June 19, 1956  R. C. DU BOIS  2,751,577
MEASURING APPARATUS
Filed Oct. 15, 1954  2 Sheets-Sheet 1

*INVENTOR.*
ROBERT CLARK DU BOIS
BY Arthur H. Swanson
ATTORNEY.

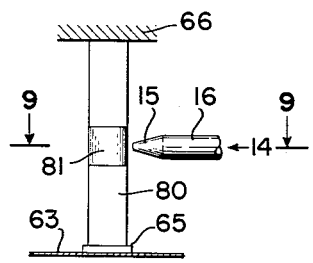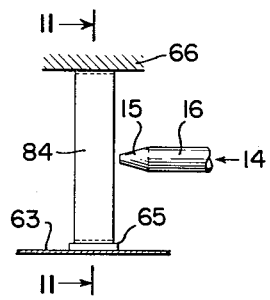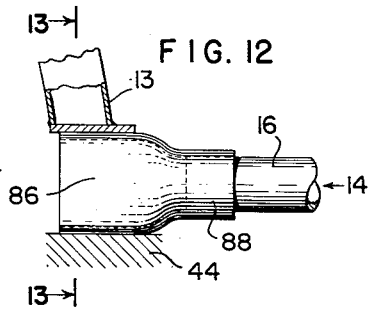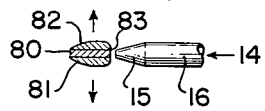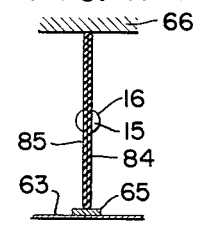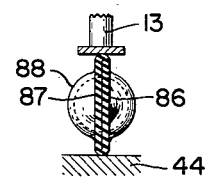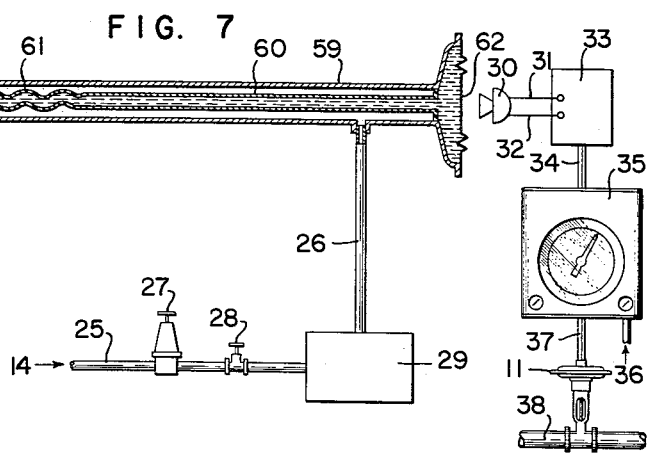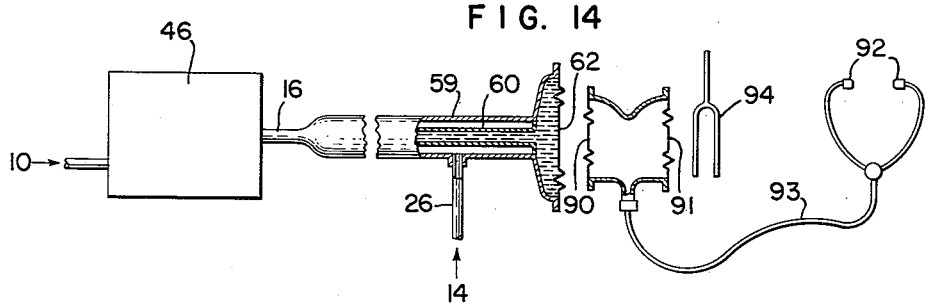

United States Patent Office 2,751,577
Patented June 19, 1956

2,751,577

MEASURING APPARATUS

Robert Clark Du Bois, Fairfield, Conn., assignor to Minneapolis-Honeywell Regulator Company, Minneapolis, Minn., a corporation of Delaware Application October 15, 1954, Serial No. 462,556

18 Claims. (Cl. 340—208)

A general object of the present invention is to use a sound wave of variable frequency as a means of transmitting the magnitude and changes in magnitude of a variable to a distantly located receiving means.

More specifically, the invention provides a new and novel transmitter which is characterized by its high speed of transmission and its freedom from explosion hazards.

Numerous industrial processes require that different variables, such as temperature, flow, pressure, etc. be measured at various points in the process and be observed at some control point. This necessitates the use of means for transmitting to the central point a signal representative of the magnitudes of the measured variables. Frequently, the exact point of measurement must be made in an area where there are explosive gases or liquids which require that nothing present in the vicinity be a possible source of a spark or other igniting condition. To eliminate this hazard, it has been found desirable to employ a suitable pressure fluid means as a transmitting medium. In addition, it is desirable to quickly observe the magnitudes of the variables so that appropriate corrective action may be made and this is achieved in the present invention by the use of a sonic pressure signal of varying frequency, said signal being transmitted at the speed of sound.

It is accordingly a further object of the invention to provide a structure which will rapidly transmit a change in the magnitude of a variable through long transmission lines.

Still another object of the invention is to provide a microphone within the aforesaid transmission line so that the frequency at which a sound is being transmitted therethrough may be safely transduced into an electrical signal without incurring any of the explosive hazards inherent in heretofore known type electrical transmitters.

Still another object of the invention is to provide in accordance with the principles of the present invention a liquid filled sack inside the aforesaid transmission line so that the frequency at which the sound is being transmitted therethrough may be more expeditiously transmitted to a receiving means.

A still further object of the present invention is to utilize a regulable elastic fluid supply pressure flowing through and out of a nozzle to vibrate a stretchable means such as a wire at a predetermined frequency when the means is under an initial tension and to vibrate the means at another predetermined frequency when a change in magnitude of a variable causes the means to deviate from the initial tension. Another more specific object of the invention is to provide the aforesaid frequency transmitting means with a sound signal to an electrical signal transducing means at a remotely located receiver arranged so that an electrical signal may be used to indicate and/or control the changes in the magnitude of a variable.

A still more specific object of the invention is to provide an apparatus that will transmit a variable in the form of a modulatable sound wave, having a frequency which varies in response to the magnitude of a variable, to the controller of a remotely located control valve so that the valve may rapidly adjust the flow of fluid through a conduit in accordance with a change in the magnitude of the variable.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which there are illustrated and described several preferred embodiments of the invention.

In the drawings:

Figure 7 shows how a liquid filled frequency transmitting sack may be placed within the aforementioned sound transmitting conduit to speed the transmission of the frequency of a sound wave through the conduit;

Figure 8 shows an alternative form of a stretchable means which may be employed as a substitute for the stretchable wire means shown in Figures 1, 2, or 3;

Figure 9 is a cross sectional view taken on section 9—9 of Figure 8;

Figure 10 shows a second form of a stretchable means which may be employed as a substitute for the stretchable wire means shown in Figures 1, 2, or 3;

Figure 11 is a cross sectional view taken on section line 11—11 of Figure 10;

Figure 12 shows a third form of a stretchable means which may be employed as a substitute for the stretchable wire means shown in Figures 1, 2, or 3;

Figure 13 is a cross sectional view taken on section line 13—13 of Figure 12; and Figure 14 shows a test apparatus including a double headed stethoscope and tuning fork apparatus employed to check the frequency that is being transmitted to the diaphragm shown, for example, in Figure 1 or Figure 7.

Unless otherwise noted corresponding components shown in the various figures carry corresponding reference characters.

Figure 1:
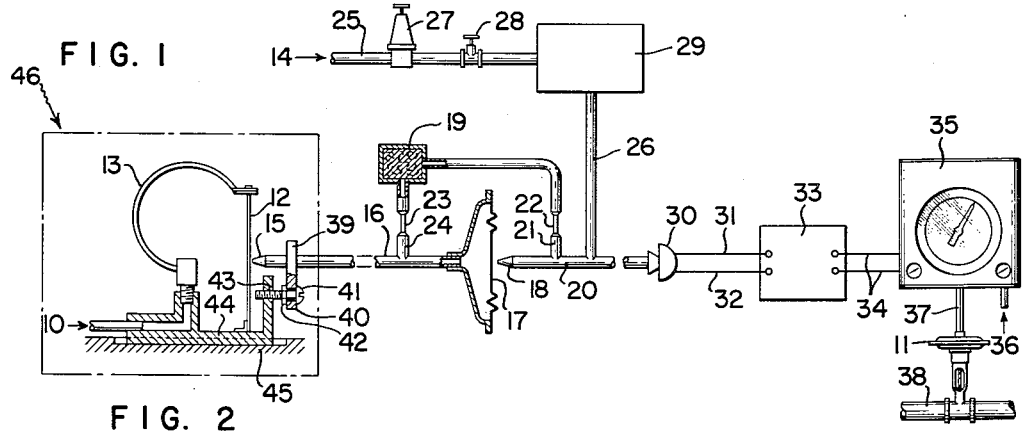
Figure 1 shows a typical system which makes use of the applicant's sound wave transmitting apparatus to transmit a signal, which is a function of a variable, to the head of a control valve.

The selected form of the invention as diagrammatically illustrated in Figure 1 shows one form of the sound transmitting apparatus being made use of in a system in which it is desired to transmit a signal to the head of a control valve 11 through a long transmission line which signal is a function of the magnitude of a variable fluid pressure 10.

The particular manner in which such a variable is permitted to administer tension to a wire 12 by means of a temperature compensated Bourdon tube 13 in accordance with a change in a variable quantity, for example, flow, temperature, or pressure is a well known practice and forms no part of the present invention.

The invention does, however, concern itself with the manner of using a regulable air pressure 14 flowing through and out of a nozzle 15 so as to excite such a wire into a state of vibration. Such excitation may cause the wire to oscillate either back and forth across a nozzle or to and away from a nozzle as shown in Figure 1.

The device of Figure 1 also shows the use of the air flowing through conduit 16 and out of the nozzle 15 as a medium through which sound waves, created by the vibration of the wire 12, may be transmitted to a diaphragm 17 which in turn is caused to act as a flapper on a nozzle 18. Such a nozzle and diaphragm 18, 17 is inserted between transmission conduits which are required to transmit a sound wave over long distances. When such long distance transmission requirements are necessary an acoustical filter 19 may also be employed to prevent the amplified sound wave from being transmitted back through a portion of the fluid pressure supply conduit 20, 21, restriction 22, filter 19, restriction 23, and conduit 24 to the conduit 16.

To maintain a continuous constant air pressure 14 in the conduit 20 and nozzles 16 and 17 as described supra there is provided in the air pressure supply line 25, 26 a pressure regulator 27, a valve 28, and a capacity tank 29.

The frequency of the sound being transmitted through the conduit 20 is received and converted into an electrical signal by the microphone 30. This microphone 30 is schematically shown connected by suitable electrical leads 31, 32 to a frequency to direct current discriminator 33. The discriminator in turn is schematically shown joined by a suitable electric connection 34 to a receiving means 35, one type of which might well be the recording electronic instrument shown in the Wills Patent 2,423,540 of July 8, 1947. This receiving means 35 can be used to record the frequency of the transmitted signal as well as regulate an air pressure flowing through the air supply conduit 36, to conduit 37 and the head of the diaphragm operated valve 11.

On the left side of Figure 1 there is shown a lug 39 which may be fixedly attached at one end to the left end of the conduit 16, by any suitable clamping means not shown. An aperture 40 is shown in the lower end of this lug 39 to accommodate the smooth upper surface of the shank of a screw 41. On this smooth portion of the shank of screw 41 there is fixedly attached a washer 42. The lower end of the shank of the screw 41 is shown in threaded engagement with an internally threaded portion 43 in a member 44 which is slidable on a base 45. Such a screw thread arrangement thus provides a means for longitudinally moving the slidable member 44 to either the right or left of the position shown in Figure 1. This means further permits an adjustment to be made between the wire 12 and the nozzle 15 so as to provide proper clearance between them before or during the actual vibration of the wire 12.

After the aforementioned apparatus shown in Figure 1 has been adjusted so as to obtain the desired clearance between the wire 12 and the nozzle 15 the regulated air supply 14 may then be permitted to flow through and out of the nozzle 15 and 18 by adjusting the pressure regulator 27 and valve 28.

When an increase in magnitude of a variable being measured occurs the fluid pressure 10 being applied to the inside wall of the Bourdon tube 13 will likewise be increased and this increase will cause the free end of the tube to be moved in an upward direction since one end of the wire 12 is attached to the free end of the tube 13 a tension proportional to the increase in the magnitude of the variable will be administered to the ends of same. This increased tension will thus cause an increase in length of the wire which will also be proportional to the increase in magnitude of the variable. This increase in wire length will force the wire to vibrate at a different frequency than that which occurred before this tensioning took place. The sound wave produced by the wire vibrating at this new frequency will be transmitted through the air under pressure 14 in the tube 16 and cause the diaphragm 17 to be vibrated at the same new frequency as the wire 12. As the diaphragm vibrates in this manner it will be forced intermittently toward and away from the nozzle 18. While the regulable air pressure 14 flows out of the nozzle 18 it will thus have transmitted through it a sound wave which is of the same frequency as the new sound wave frequency of the wire 12. This sound wave will travel to the right through the tube 20 to a microphone where the sound wave is transduced into an electrical signal of this same frequency. This electrical signal is transmitted by the electrical leads 32 to the frequency to D. C. discriminator 33 and thence by the electrical connection 34 to the receiving means 35. This receiving means 35 in turn is used to regulate the air pressure flowing through the conduit 36, 37 to a control valve 11 located in a flow line 38.

It can thus be seen that this receiving means 35 will regulate the position of the stem of the valve 11 in accordance with the magnitude of the signal which it receives and will thus make the flow of fluid through the conduit 38 a function of the magnitude of the fluid pressure 10.

Figure 4:
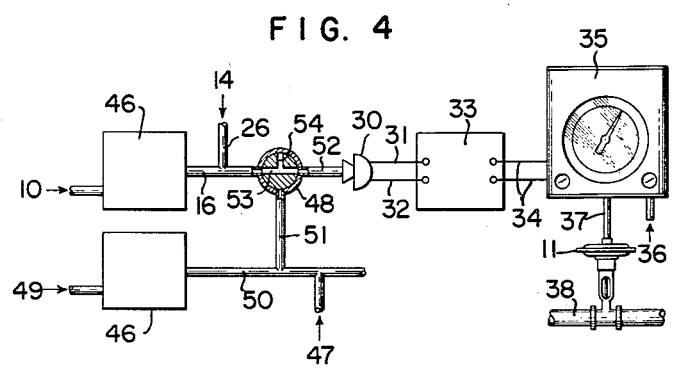
Figure 4 shows a schematic arrangement of how any two of the tensioning means shown in Figure 2 or Figure 3, or two units of the type disclosed within the dot dash enclosure of Figure 1 as indicated may be combined with a transfer valve to enable either one of the two tensioning means to transmit their respective frequencies to a receiving means.

Figure 4 shows a transmitting apparatus represented by the reference characters 46, 16, 26, 52, 30—37, and 11 which is similar to the transmitting apparatus shown in Figure 1. One of the differences between these figures is that the amplification means, for example, 17, 18, 20 shown in Figure 1 has been eliminated in Figure 4. Another difference is that in Figure 4 a standard plug type transfer valve 48 has been inserted in the transmission line 16. Also added to this Figure 4 is a second sound wave transmitting means 46, having a regulable fluid supply 47 which is identical to the fluid pressure supply means 25—29 shown in Figure 1. Also added are the conduits 50, 51 for connecting the second sound transmitting means 46 with the transfer plug valve 48. This figure further discloses a pressure input signal 49 which is shown being applied to a wire tensioning apparatus of the second sound transmitting means 46 in the same manner as the pressure input signal 10 shown in detail in Figure 1. The plug of the valve 48 in Figure 4 is shown with a horizontal passageway 53 therein which connects conduit 16 with conduit 52 so that the pressure signal 10 may be transmitted in the form of a sound wave to the receiving means 35. By manually rotating this plug in a clockwise direction until the right end of the passageway 53 is in alignment with the conduit 51 and the passageway 54 is in alignment with conduit 52 the conduit 16 may be plugged off in such a manner as to enable the pressure signal 49 to be transmitted in the form of a sound wave to the remotely located receiving means 35.

This transfer valve thus provides a manual means of cutting in or out either of the sound signals being transmitted to a single receiving means such as the type of receiving means 35 set out in the description of Figure 1 in order to control the degree to which a control valve is actuated towards an open or closed position. In this way a multiple record may be obtained.

Figure 5:
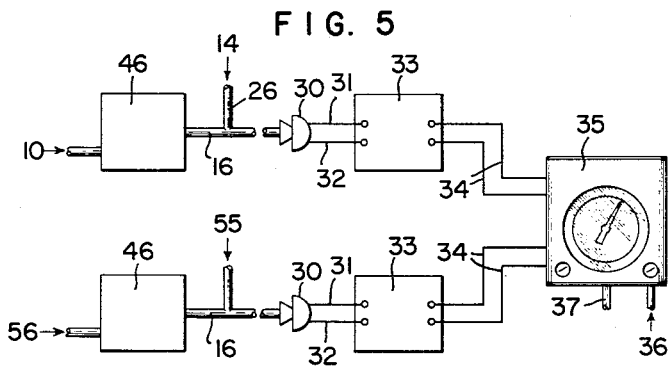
Figure 5 shows still another schematic arrangement of how any two of the already referred to tensioning means such as the type disclosed within the dot dash enclosure of Figure 1 may simultaneously transmit their respective frequencies to a receiving means.

Figure 5 shows a first input signal 10 and a first transmitting apparatus represented by the reference characters 46, 16, 30—35 which is similar to the transmitting apparatus shown in Figure 1. One of the differences between these figures is that the amplification means 17, 18, 20 shown in Figure 1 has been eliminated in Figure 5.

Another difference is that there is added to Figure 5 a second sound wave transmitting means 46 having a regulable fluid supply 55 which although only partially shown, may be identical to the fluid pressure supply means 25—29 shown in Figure 1. This second sound wave transmitting means is shown with a second input pressure signal 56 connected thereto which signal is used to place tension on a wire in a manner similar to that shown for the first pressure signal 10. To this second sound transmitting means is connected, in the same manner as the first transmitting apparatus, a conduit 16, a microphone 30, electrical connections 31, 32, a frequency to D. C. discriminator 33, and an electrical connection 34 between the discriminator 33 and the receiving means 35.

By connecting each of the independently operated transmitting means 46, 46 to a single receiving means 35 in this manner this receiving means may be used for example to selectively apply a fluid pressure signal that is a function of either of the sound wave transmitting means 46, 46, to the head of a control valve not shown.

Figure 6:
Figure 6 shows how a microphone of a receiving means, such as the microphone shown in Figure 1, may be placed adjacent the tensioning means by placing the microphone and electrical leads to same within a sound transmitting conduit.
Figure 6:
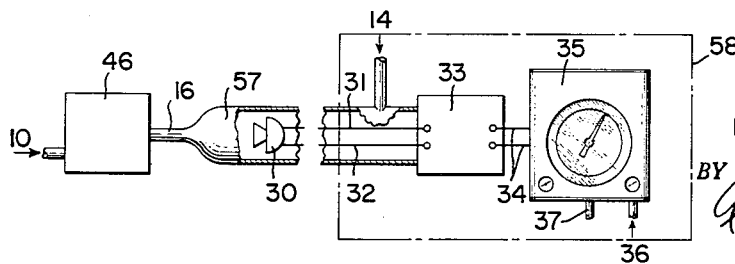

Figure 6 shows a transmitting apparatus represented by the reference characters 46, 16, 57, 30—35 which is similar to the transmitting apparatus shown in Figure 1. Figure 6 differs however from Figure 1 in that the amplification means 17, 18, 20 shown in Figure 1 has been eliminated. A still further difference is that in Figure 6 the right end of the conduit 16 has been enlarged at 57 to form an enclosure to accommodate a microphone placed therein. With this arrangement the amplification means 18, 20 shown in Figure 1 may be eliminated even in cases where the receiving means 45 is located at a control station 58 which is at a considerably long distance from the transmitting means 46. The reason why this is possible is that the microphone 30 in the chamber 57 can safely be located in a position very close to the transmitting means 46 without creating an explosive hazard.

With the arrangement in Figure 6 it can be observed that because a regulable supply of air 14 flows through conduit 26, the enclosure 57, conduit 16 and out of the nozzle 15, not shown, there is a continuous purging of any explosive gases which may be present and might otherwise come in contact with a spark generated by a short in the electrical connections 31, 32.

Still another safety feature which this apparatus affords is that the microphone 30 may be located at a sufficient distance from the nozzle 15 as to prevent a path of a flame from reaching the nozzle should such a flame occur. This arrangement thus eliminates the hazard that would be present if the microphone were located outside the chamber 57 and in contact with such explosive gases.

Figure 7 shows a pressure regulated fluid supply apparatus 24—29 and a transmitting apparatus represented by the reference characters 46, 16, 59—61, 17, and 30 which is similar to the transmitting apparatus shown in Figure 1. Figure 6 differs from Figure 1 in that the amplification means 17, 18, 20, shown in Figure 1 has been eliminated. A still further difference is that in Figure 7 the right end of the conduit 16 has been enlarged at 59 to accommodate a flexible sack 60 filled with a liquid 61. This Figure 7 also shows the right end of the enlarged portion 59 extruded in the form of a flange. The inner diametral portion of this flange on the end of 59 is shown fixedly attached by a suitable bonderizing material to the right end of the flexible sack 60. The outer diametral portion of this flange is shown fixedly attached by a suitable bonderizing material to the outer peripheral portions of a flexible diaphragm 62.

The purpose of enclosing the liquid 61 within the sack 60, the flange portion of 59, and the diaphragm 62 is to provide a vehicle through which the sound waves developed by the vibrating wire 12 of the transmitting means 46 may be transmitted. Since this liquid is more dense than air it will provide a much faster medium through which the sound wave may be transmitted from the transmitting means 46 to a microphone and receiving means 30—35 than will be afforded by any other previously mentioned transmitting apparatus that uses air as a sound transmitting medium. Also a signal of greater magnitude can be transmitted to a receiver if the medium through which the signal is traveling is liquid rather than air. It can thus be seen that when a liquid system of the type set out in Fig. 7 of this application is used a greater transmitting distance between the transmitting means 46 and receiving means 30—35 may be acquired than would be possible if the signal were transmitted through an air filled transmission line.

Figure 2:
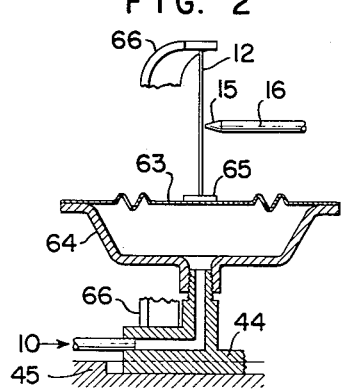
Figure 2 shows a means for placing a tension on a diaphragm actuated stretchable means such as a wire which could be readily substituted for the Bourdon tube type of stretchable means shown in the dot dash line enclosure of Figure 1.

Figure 2 shows a wire tensioning means comprising a diaphragm 63, a weight 65, a flange 64, and a bar 66 which may be substituted for the Bourdon tube 13 type of tensioning means shown in Figure 1.

Figure 2 also shows a compressible fluid 10 whose pressure varies in accordance with the change in magnitude of a variable quantity as does the fluid pressure 10 shown in Figure 1. The wire 12 shown in Figure 2 has one of its upper ends fixedly attached to the member 44 by means of the bar 66. The lower end of the wire may be fixedly attached in any desirable manner to a diaphragm 63 by means of the weight 65 shown which weight in turn may be cemented or bonderized to the diaphragm 63 or attached to the diaphragm by means of any other equivalent weight structure such as a spring load.

With this arrangement the wire is forced by the difference between the weight acting on one side of the diaphragm and the fluid pressure 10 acting on the other side of the diaphragm to a predetermined initial state of tension. When, however, any pressure change occurs in the magnitude of the compressible fluid pressure 10 it will change the position of the diaphragm and weight attached thereto. This diaphragm action thus provides a means whereby the tension in a wire may be changed from a predetermined taut state to a less taut state when the fluid pressure 10 is increased. This action further provides a means whereby the predetermined taut state of the wire may be altered to a much greater state of tension when the fluid pressure 10 is decreased. The reason for this latter increase in tension is due to the force of gravity which will allow the diaphragm and weight attached thereto to apply a much greater downward force on the wire as the initial force of the fluid pressure 10 acting on the diaphragm is reduced.

Figure 3:
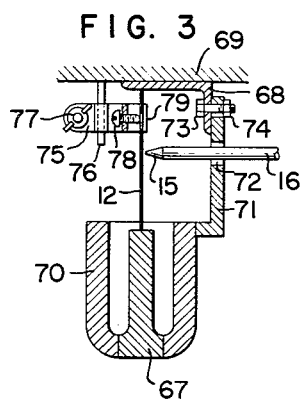
Figure 3 shows a means for placing a tension on a bimetal actuated stretchable means such as a wire which could also be readily substituted for the Bourdon tube type of stretchable means shown in the dot dash line enclosure of Figure 1.

Figure 3 shows a bimetal wire type of tensioning means which may be substituted for the Bourdon tube type of tensioning means shown in Figure 1. This bimetal tensioning means may be used when, for example, it is desired to tension the wire 12 in accordance with the expansion and contraction of two metals, one metal 67 of which is made of a low expansion metal and another metal 70 of which is made of a high expansion metal.

The wire 12 shown in Figure 3 has one end fixedly attached to an angle plate 68 which in turn is mounted in any desirable manner for slidable movement in a horizontal direction on a support 69. The other end of the wire is fixedly attached to the center of one metal portion of the aforementioned bimetal member. The lower portion of the member 67 is in turn slidably connected to the second metal portion 70 of the bimetal member and this latter member in turn to an L-shaped member 71. The upper end of member 71 may be weldably attached or attached by a nut and bolt connecting means 73, 74 as shown to the angle plate 68. The L-shaped member 71 is also provided with a bored out portion 72 so that the conduit 16 and nozzle 15 may be inserted therethrough. When the lower portion of the well formed by the bimetal tensioning means 67, 70 is exposed to a temperature of increasing magnitude, the higher outside expansion metal 70 will tend to effectively expand in an upward and downward direction. As this expansion takes place the inner, lower expansive metals 67 of the well will also be moved in a downward direction with the higher expansive metal. This action tends to increase the tension placed on the wire 12. While this overall downward movement is taking place the inner lower expansive metal 67 is expanding at a much slower rate in both an upward and downward direction. This latter action tends to decrease to a limited degree the first tension placed on the wire by the expansion of the high expansive metal 70. The opposite effect to that already explained will obviously take place when the bimetal 67, 70 is exposed to a temperature of decreasing magnitude. It can thus be seen that such a bimetal device may be used to transmit a tension to a wire which tension is equal to the difference in expansion of two metallic well parts, when the parts are subjected to a change in temperature.

Also shown in this figure is a lug means 75 for shortening the active of vibratable length of the wire 12 which means is slidably mounted for movement along a shaft 76 fixedly attached to support 69. Fixedly attached to the lug means 75 is a screw 78 and plate means 79 respectively located on the opposite sides of the wire 12. A wing nut 77 is also shown in this figure to provide a means of clamping the lug 75 in any fixed position along the shaft 76. Once this clamp secures the lug means 75 in the position to which the wire 12 is to be shortened the screw 78 may then be turned in an inward direction and this latter action will force the wire to be clamped at this point. Such a lug means 75 and its associated parts thus provides a means for shortening or lengthening the vibratable part of the wire 12. This adjustment also provides a means of adjusting the frequency range and pitch of a sound produced by a vibrating wire.

Figures 8 and 9 shows a modified form of a stretchable string means 80 which may be used as a substitute for the wire 12 shown in Figure 2. This string means 80 is of a thin rectangular configuration and has a thickened portion 81, 82 on the opposite sides of a part thereof midway between its ends. This thickened portion 80, 81 may be formed by soldering a bead of solder to either side of the flat wire 80 and then flattening the portion 83 adjacent the nozzle 15 as indicated in Figure 9.

As the regulable fluid pressure 14 passes out of the nozzle 15 it will vibrate the flat wire 80, 81 in a back and forth manner across the nozzle 15 in the direction of the arrows indicated in Figure 9. The frequency at which this wire will vibrate will depend upon the magnitude of the variable fluid pressure 10 acting on the diaphragm 63 as already explained under Figures 1 and 2.

In a manner similar to that previously explained under the description of Figure 2 one end of this flat wire 80 is fixedly secured to the bar 66 and the other end to a flexible diaphragm by means of a weight 65.

Figures 10 and 11 show still another modified form of stretchable means which may be used as a substitute for the wire 12 for example shown in Figure 2. This type of stretchable means is made by placing two vertically positioned resilient portions 84, 85 side by side as shown in Figure 1. Sufficient clearance is allowed between these members so that the fluid 14 flowing through and out of the nozzle 15 between these portions will place these portions into vibratory motion. In a manner similar to that as previously explained under the description of Figure 2, one end of these resilient portions 84, 85 is fixedly secured to a bar 66 and the other end is fixedly secured to a flexible diaphragm by means of a weight 65. This apparatus will afford a means by which sound waves may be transmitted which are of the same frequency as those produced by the wire shown in Figure 2.

This flat, dual resilient flexible means 84, 85 will however make it possible to transmit a much more intense sound than is afforded by the wire 12 shown in Figure 2. Another advantage of this stretchable means 84, 85 is that since this means magnifies the intensity of the sound, the sound receiving means previously described need not be located as close to the stretchable means as is necessary when a vibrating wire without a line amplifier is used for this purpose.

Figures 12 and 13 show still another dual stretchable means which can be substituted for the wire 12 for example as shown in Figure 1. This stretchable means is made of a molded boot construction having two vertically resilient portions 86, 87 having their inner surfaces in contact with one another. The rear end of this boot is shown snugly fitted over the open end of conduit 16. As the fluid 14 flows out of the conduit 16, it will intermittently force the inner surfaces of 86, 87 apart from one another and thus place the resilient members in a state of continuous vibration. In a manner similar to that as previously explained under the description of Figure 1, one end of the resilient portions 84, 85 is fixedly secured to a base member 44 and the other ends attached to the moveable end of a Bourdon tube means 13.

For the same reason set out under the explanation of Figures 10 and 11, this dual resilient means 86—88 will likewise make it possible to transmit a such more intense sound than is afforded by the wire 12 shown in Figure 1.

Figure 14 shows a test apparatus comprising a double headed stethoscope having two diaphragm members 90, 91 at its transmitting end, a standard sound receiving head set 92 at the receiving end and a suitable open ended flexible conduit 93 therebetween. Also shown in this figure is a standard tunning fork 94. This tuning fork 94 and the double headed stethoscope 89—93 may be employed as a means for checking the frequency of transmission of the transmitting means, such as the transmitting means 46 against the standard of the tuning fork 94. The frequency actually being received by the diaphragm 62 will be that of the transmitter if there is no abnormality in the circuit so that the frequency at 62 may be compared directly with the tuning fork 94. If, for example, the frequency of the fork does not agree with the frequency from the diaphragm 62 a fluctuation in the loudness of the sound generally referred to as beats will be heard at the listening end of the stethoscope. If beats are present the active or vibratible length of the string can then be adjusted by adjusting the lug means such as the lug means 75, 79 shown in Figure 3 to make the transmitted and received frequencies agree with one another.

From the aforementioned description and operation, it is thus evident that the sound transmitting apparatus described provides a very rapid means of transmitting the magnitude and changes in magnitude of a variable to a remote receiving means.

The frequency range which is best suited for this sound wave transmitting apparatus is one which should preferably be within the audio frequency range limit of approximately 100 to 10,000 cycles per second. The best minimum frequency at which such a transmitting apparatus should be operated will be the frequency which is sufficiently high enough to overcome any undesirable vibration or noise that is present in the atmosphere surrounding the transmitter. For example, it has been established that for a 500 foot length of transmission tubing the full change in response to a step change in the magnitude of a variable will occur in approximately one-half second as compared to ten or more seconds needed with presure systems other than the sound transmitting type disclosed in this application. Furthermore, if a microphone is place in such a transmission line such as the microphone shown in Figure 6 this one-half second lag may be reduced to a negligible value.

While, in accordance with the provisions of the statutes, there has been illustrated and described the best forms of embodiment of the invention now known, it will be apparent to those skilled in the art that changes may be made in the form of the apparatus disclosed without departing from the spirit of my invention as set forth in the appended claims and that in some cases certain features of the invention may be used to advantage without a corresponding use of other features.

Having now described my invention, what I claim as new and desire to secure by Letters Patent is as follows:

1. A sound wave transmitter for transmitting a sound signal whose frequency varies over a predetermined range comprising, a regulable fluid supply pressure transmitting conduit, a bleed nozzle attached to one end of said conduit, a vibratable string, said nozzle having a fluid under pressure issuing therefrom acting as a means for vibrating said string, and means for subjecting the ends of said string to a predetermined tension when a variable to be determined is of one magnitude and subjecting it to other tensions when said variable is of other magnitudes, said supply pressure conduit acting to transmit the sound of said string vibrations through said conduit.

2. A sound wave transmitter comprising, a transmitting conduit adapted to have therein a fluid under pressure, an opening on one end of said conduit for bleeding the fluid flowing through said conduit to the atmosphere, a stretchable means vibratable by the fluid bled from said opening, and a means for adjusting the frequency of vibration of said stretchable means, said transmitting conduit and the fluid therein acting as a medium through which sound waves formulated by the vibration of said stretchable means are transmitted.

3. In a pneumatic system for telemetering sound waves at a frequency which is a function of the magnitude of a variable comprising, a nozzle, a regulable fluid supply adapted to supply a fluid to flow through a supply conduit and out of said nozzle, a pressure to force transducer to apply a tension on the end of a string proportional to said variable, said string being positioned in closed proximity with said nozzle, said fluid flowing from said nozzle acting to vibrate said string, and means including said supply conduit acting as a vehicle through which sound waves produced from the vibration of said string may be transmitted to a remotely located receiving means.

4. In a telemetering system for transmitting a sound signal through a conduit comprising, a transmitting conduit for transmitting a regulable fluid under pressure to and through a nozzle, a string adjacent said nozzle, a transducer for tensioning the string proportional to the magnitude of a varying force, said fluid acting to place said string in vibratory motion, and a flexible liquid filled sack in said conduit for transmitting sound waves produced from said vibratory motion to a remotely located receiving means.

5. In a telemetering system for transmitting a sound signal through a conduit at a magnitude which is a function of the magnitude of one of a plurality of variables comprising, two nozzles, a regulable supply of fluid under pressure connected to said conduit, a first variable to force transducer for elongating a string in accordance with the magnitude of one of said variables, a second variable to force transducer for elongating another string in accordance with the magnitude of a second of said variables, one of said nozzles being positioned in close proximity with one of said strings and the other of said nozzles being positioned in close proximity with the other of said strings so that a vibratory sound signal will be produced by the respective strings, a transfer valve positioned in said transmitting conduit, a connection between each of said nozzles and said transfer valve, said valve being arranged for selectively passing the sound propagated by said string of one or the other of said transducers to a remotely located receiving means.

6. An apparatus for transmitting and converting sound waves into equivalent electrical signals comprising, a plurality of sound transmitting means each having a nozzle, a regulable fluid supply connected to said nozzle, a microphone, a wire positioned to be subjected to fluid flowing from said nozzle and set into vibration thereby, a tensioning means for stretching said wire in accordance with the magnitude of a varying force to vary the frequency of vibration thereof, a sound transmitting conduit between the nozzle and said microphone, and each of said transmitting means having an electrical signal transmitter attached at one end to each of their respective microphones and having each of their other ends connected to a signal receiver.

7. In a pneumatic system for transmitting sound waves at a frequency which is a function of a varying pressure comprising, a nozzle, a regulable supply of fluid under pressure flowing through a supply conduit and out of said nozzle, a pressure to force transducer to apply a tension on the ends of a string proportional to the varying pressure, said string being in close proximity with said nozzle, said force of said nozzle pressure acting to place said string in vibratory motion, a sound to electrical signal transducing means inside said pneumatic supply line, an electrical signal receiving means, and an electrical transmitting means between said transducing means and said signal receiving means for transmitting an electrical signal which is a function of the frequency of said vibrating string to said signal receiving means.

8. In a pneumatic system for transmitting sound waves at a frequency which is a function of the magnitude of a variable comprising, a nozzle, a regulable supply of fluid flowing through a conduit and out of said nozzle, a thin rectangular cross sectioned flexible plate having a bead of ellipsoidal configuration at a point midway between its ends, a variable responsive means for applying longitudinal tension to said plate in relation to the magnitude of the variable, said narrow width of said plate and the major axis of said bead being in close proximity with said aperture forming said nozzle so that said fluid flowing through said nozzle vibrates said plate, and means including said conduit acting as a vehicle through which sound waves produced from the vibration of said plate may be transmitted to a remotely located receiving means.

9. In a pneumatic system for transmitting sound waves at a frequency which is a function of the magnitude of a variable comprising, a nozzle, a pressure regulable supply of fluid for producing a fluid flow through a conduit and out of said nozzle, a vibratable member formed by two adjacent resilient portions having a fluid passage therebetween, a variable responsive means connected to and applying tension on the ends of said member in accordance with the magnitude of said variable, said central portions of said member being in such close proximity with said nozzle that said fluid flowing through said nozzle will vibrate said members, and means including said conduit acting as a vehicle through which sound waves produced from the vibration of said members may be transmitted to a remotely located receiving means.

10. In a telemetering system for transmitting a sound signal through a conduit comprising, a transmitting conduit for transmitting a regulable supply of fluid to and through a nozzle, a string adjacent said nozzle, a transducer for tensioning the string proportional to the magnitude of a varying force, said fluid acting to place said string in vibratory motion, a flexible liquid filled sack in said conduit for transmitting sound waves produced from said vibratory motion to a vibratable diaphragm, a microphone adjacent said diaphragm, a remotely located electrical signal receiving means and an electrical connection between said microphone and said means, said microphone acting to send an electrical signal through said connection to said means which is of the same frequency as the sound signal being transmitted by said diaphragm.

11. In a telemetering system for transmitting a sound signal through a conduit comprising a transmitting conduit for transmitting a regulable fluid supply to and through a nozzle, a string adjacent said nozzle, a transducer for tensioning the string by an amount which is a function of the magnitude of a varying force, said fluid acting to place said string in vibratory motion, a flexible liquid filled sack in said conduit for transmitting sound waves produced from said vibratory motion to a remotely located vibratable diaphragm, and a double ended stethoscope and fork means for indicating whether the frequency being transmitted by said string agrees with the frequency of said fork means.

12. In a pneumatic system for transmitting sound waves at a frequency proportional to the difference in expansion and contraction of two metal well parts having different coefficients of expansion comprising, a wire fixedly attached at one end to one of said parts and attached at its other end to the other of said parts, a nozzle, a regulable fluid supply flowing through and out of said nozzle to vibrate said wire, said differences in said coefficient of expansion acting to increase or decrease tension on the ends of said wire and to change the frequency of same as said parts expand or contract, and a fluid supply conduit connected to said nozzle acting as a vehicle through which sound waves produced from the vibrations of said wire may be transmitted to a remotely located receiving means.

13. In a pneumatic system for transmitting sound waves at a frequency which is a function of the magnitude of a variable comprising, a nozzle, a regulable supply of fluid flowing through a conduit and out of said nozzle, a pressure to force transducer to apply a tension on the end of a string proportional to said variable, said string being in close proximity with said nozzle so that said fluid flowing out of said nozzle will vibrate said string, said conduit acting as a vehicle through which sound waves produced from the vibration of said string may be transmitted to a remotely located receiving means, and a pneumatic relay comprising a sound amplifier and filter positioned in said conduit between said nozzle and said receiving means for amplifying said sound as it is transmitted through said conduit.

14. In a pneumatic system for telemetering sound waves at a frequency by an amount which is a function of the magnitude of a variable comprising, a nozzle, a regulable supply of fluid flowing through a conduit and out of said nozzle, a transducer to apply a tension on the ends of a string by an amount which is a function of said variable, said string being in close proximity with said nozzle, said fluid flowing out of said nozzle acting to place said string in vibratory motion, a sound to electrical signal transducing means inside said conduit, an electrical signal receiving means in said conduit and an electrical transmitting means between said sound to signal transducing means and said signal receiving means for transmitting an electrical signal proportional to the frequency of said vibrating string, a motor operated control valve, a connection between said signal receiving means and said valve for transmitting said electrical signal to said valve so that said valve is opened or closed in accordance with the signal transmitted thereto.

15. A sound wave transmitter comprising, a fluid supply transmitting conduit, a nozzle attached to one end of said conduit for bleeding a fluid flowing through said conduit to atmospheric pressure, a string, said string vibratable by said fluid bled from said nozzle, a weight means for placing an initial tension on said string and a means for adjusting the initial tension and frequency of said vibrating string, said fluid acting as a medium through which a sound wave formulated by said vibration of said string is transmitted.

16. A pressure wave telemetering apparatus comprising, a fluid transmitting conduit having an outlet, a vibratable member having vibrations induced therein by the passage of fluid from said outlet, a variable responsive means for varying the vibratory frequency of said vibratable member, and means including said transmitting conduit for transmitting the pressure wave vibrations of said member to a pressure wave receiving means.

17. Apparatus to transfer a pressure wave vibration of varying magnitude from a stationary pressure wave generating means to a remotely located pressure wave receiving means comprising, the combination of an open ended conduit containing a non-pulsed fluid that flows at a constant rate between said conduit ends and a pressure wave generating means operably connected to one end of said conduit to initiate a pressure wave vibration in said fluid in accordance with the magnitude of a constantly changing variable.

18. A sonic pressure wave telemetering apparatus comprising, a sonic pressure wave transmitting conduit having a restrictable opening at one end, a stationary means positioned adjacent said opening and cooperating with said opening to generate a sonic wave of a varying frequency in said conduit, and means located at the other end of said conduit to detect and record incremental changes in the frequency of said generating wave.

References Cited in the file of this patent

UNITED STATES PATENTS

| | | |
|---|---|---|
| 2,153,254 | Johnston et al. | Apr. 4, 1939 |
| 2,295,399 | Hanna | Sept. 8, 1942 |
| 2,466,809 | Hobbs | Apr. 12, 1949 |
| 2,524,031 | Arps | Oct. 3, 1950 |
| 2,601,391 | Halpern | June 24, 1952 |